June 22, 1926.

W. SEIZ 1,590,065

SPEED CONTROL SYSTEM

Filed Sept. 8, 1924

Inventor:
Walter Seiz,
by *Alexander S. Lunt*
His Attorney.

Patented June 22, 1926.

1,590,065

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

SPEED-CONTROL SYSTEM.

Application filed September 8, 1924, Serial No. 736,417, and in Germany January 11, 1924.

My invention relates to speed control systems, and has for its object the provision of an improved arrangement for controlling the excitation of a commutator machine which is concatenated with an induction motor for the purpose of controlling its speed.

In operating speed control sets comprising a main induction motor and a regulating commutator machine concatenated therewith, it is customary to supply a part of the commutator machine excitation from a frequency changer which is supplied with current through a transformer provided with taps for controlling the motor speed. This arrangement has the disadvantage that it necessitates the use of regulating apparatus which is both large and expensive. In accordance with my invention a synchronous generator is arranged to supply the current required by the frequency changer, and the size and complexity of the control apparatus required are greatly reduced for the reason that the motor speed may be controlled in response to changes in the direct current excitation of the synchronous generator.

My invention will be better understood from the following description when considered in connection with the accompanying drawing and its scope will be pointed out in the appended claims.

Figure 1:
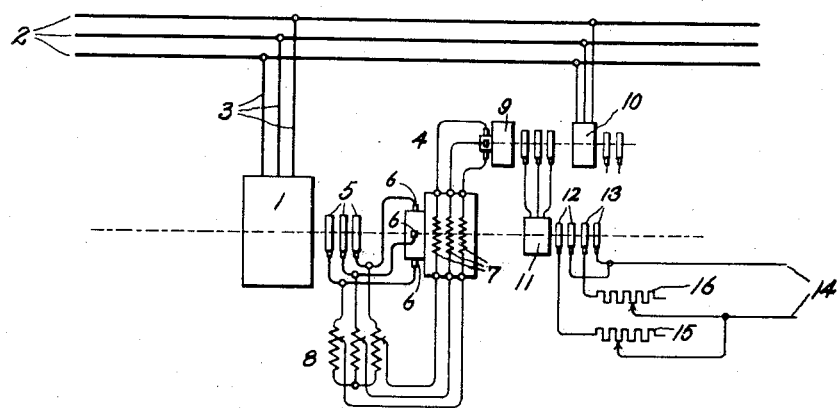
Figure 2:
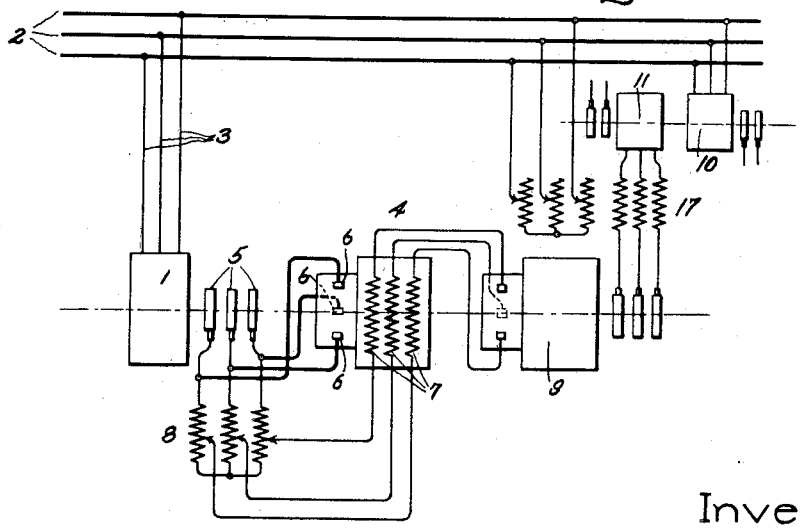

Referring to the drawing, Fig. 1 shows a speed control system in which my invention has been embodied, and Fig. 2 shows a further modification of the same system.

Fig. 1 shows a main induction motor 1 which is arranged to have its primary winding supplied with current from the power mains 2 through leads 3 and which has its secondary winding interconnected with a commutator machine 4 provided for the purpose of regulating the motor speed. The slip rings 5, which form the terminals of the motor secondary winding, are connected directly to the commutator brushes 6 of the machine 4 and to the field winding 7 of this machine through a transformer 8 the taps of which may be adjusted to determine the proportion of the commutator machine excitation supplied through this transformer. The remainder of the commutator machine excitation is supplied from the frequency changer 9 which is illustrated as driven by the synchronous motor 10 and as supplied with current from a synchronous generator 11 mounted on the shaft of the motor 1 together with the regulating commutator machine 4.

In order to change the speed of the main motor it is necessary that means be provided for controlling the armature voltage of the regulating machine 4. This result is accomplished by variation in the value of the exciting current of the field winding 7 which, as previously indicated, is supplied with current both through the transformer 8 and the frequency changer 9. The exciting current supplied through the transformer 8 is controlled by adjusting the taps of this transformer. For the purpose of regulating the phase and value of the current supplied to the exciting winding 7 from the frequency changer 9, the synchronous generator 11 is provided with field windings angularly displaced from one another and arranged to have their currents controlled independently of one another.

One of the generator field windings is connected to the slip rings 12 and the other of the windings is connected to the slip rings 13. These two field windings are arranged to be supplied through the line 14 with currents which may be independently regulated by means of the adjustable resistors 15 and 16 as desired. With this arrangement, the angular relation between a given radius of the generator armature and the total resultant field produced by the two windings may be readily changed simply by adjusting the resistors 15 and 16 to properly proportion the parts of the generator field flux between the angularly displaced field windings. These field windings and the resistors 15 and 16 thus afford a simple and reliable means of controlling the value and phase of the current supplied to the commutator machine field winding 7 from the frequency changer 9.

The arrangement shown by Fig. 2 differs from that shown by Fig. 1 in that a transformer 17 is provided for the purpose of regulating the phase and value of the current supplied to the field winding 7 through the frequency changer 9 and in that the synchronous generator 11 is arranged to be driven by the motor 10 while the frequency changer 9 is mounted on the shaft of the main motor. In this arrangement the primary winding of the transformer is connected to the power mains 2 and the voltage it induces in the line interconnecting the machines 9 and 11 is determined by the position of its movable contacts. The other features of this modification will be readily understood from what has been said in connection with Fig. 1.

I have explained my invention by illustrating and describing certain specific embodiments thereof, but it will be readily understood by those skilled in the art that the arrangements of these embodiments may be modified in certain of their details. I, accordingly, do not wish to be restricted to the particular arrangements disclosed herein by way of example for the purpose of setting forth my invention in accordance with the patent statutes. The terms of the appended claims are, therefore, not restricted to the precise arrangements disclosed, but are intended to cover all changes within the true spirit and scope of my invention.

What I claim as new and desire to secure by Letters Patent of the United States is:

1. A speed control system comprising a main induction motor of the wound secondary type, a commutator type regulating machine concatenated with said main motor, a frequency changer for supplying excitation to said regulating machine, and a generator used solely for supplying a regulable excitation to said frequency changer.

2. A speed control system wherein a regulating machine is concatenated with a main motor for controlling its speed and wherein exciting current is supplied to the said regulating machine from a frequency changer, comprising a synchronous generator for supplying current to said frequency changer, and means associated with said generator for controlling the phase and value of the current delivered by said generator.

3. A speed control system wherein a regulating machine having a field winding is concatenated with a main motor for controlling its speed and wherein current is supplied to the field winding of said regulating machine from a frequency changer, comprising a synchronous generator for supplying current to said frequency changer, and means for varying the excitation of said generator.

4. A speed control system comprising a main induction motor of the wound secondary type, a commutator type regulating machine concatenated with said main motor, a frequency changer for supplying excitation to said regulating machine, a generator for supplying excitation to said frequency changer, and means for regulating said generator for controlling said main motor.

In witness whereof, I have hereunto set my hand this 26th day of August, 1924.

WALTER SEIZ.